United States Patent Office 2,932,523
Patented Apr. 12, 1960

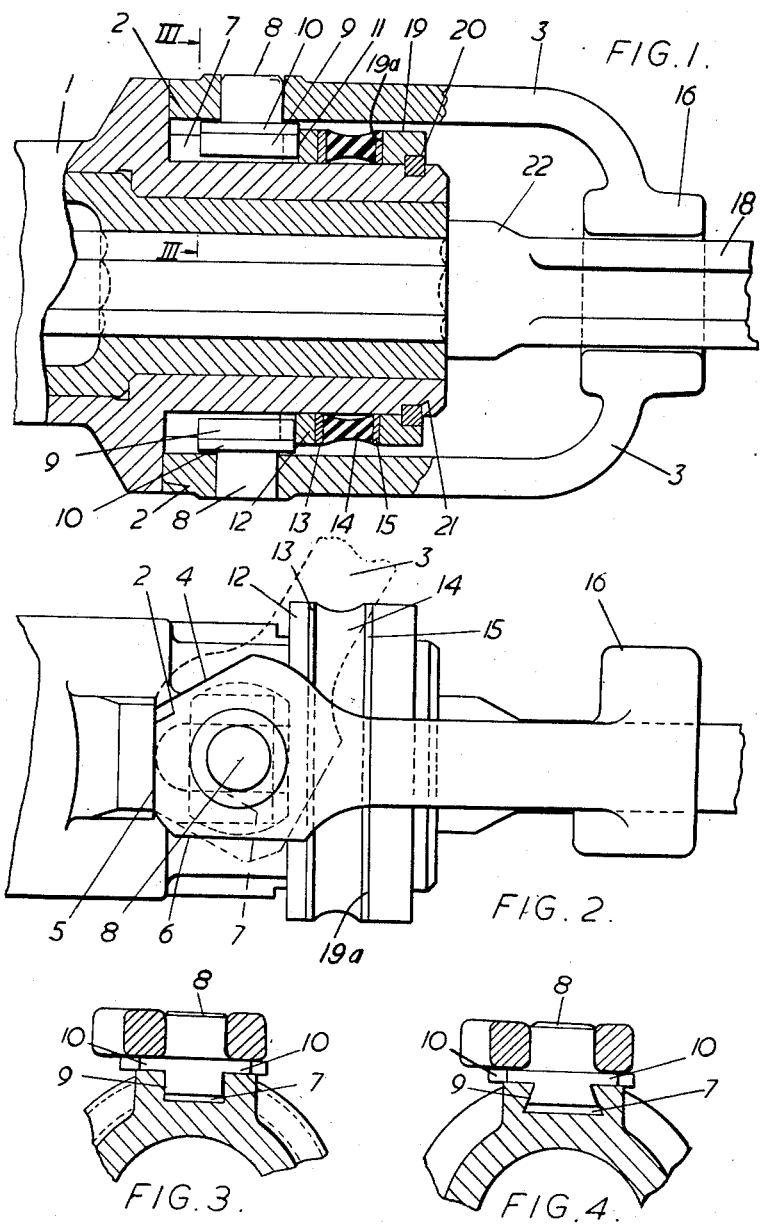
Inventor
GEORGE ALLAN DEY

2,932,523
RETAINER FOR PERCUSSIVE TOOL

George Allan Dey, Fraserburgh, Scotland, assignor to Chicago Pneumatic Tool Company, New York, N.Y., a corporation of New Jersey Application March 25, 1958, Serial No. 723,901

7 Claims. (Cl. 279—19.5)

This invention relates to implement retainers of power operated tools, such as percussive drills, and is concerned with that general kind of implement retainer which comprises a latching member that is pivotally arranged with respect to the tool so that it is movable to and from positions in one of which it cooperates with a collar on the implement to retain the shank of the implement in the chuck or socket or front head of the tool and in the other of which it is clear of the implement so as to permit withdrawal of the shank thereof from the chuck, socket or front-head of the tool. One of the objects of the invention is to provide an improved form of implement retainer having resilient means, for retaining the latching member in either of the two positions referred to such that movement of the latching member from either to the other of these two positions does not involve undue manual effort. A further object is to provide an implement retainer of which the resilient means referred to also serves as a buffer or snubber to absorb the impact if, in the case of a percussive tool for example, the collar of the implement should be forcibly driven against the latching member. A still further object is to provide an implement retainer in which the resilient means referred to is compact and unlikely to fracture under impact.

According to the present invention an implement retainer of a power-operated tool comprises a latching member pivoted about an axis perpendicular to the axis of the chuck, socket or front-head of the tool and of the implement upon a trunnion that is movable relatively to the chuck, socket or front-head parallel to the latter axis and is resiliently biassed towards an abutment surface of the tool that is transverse of the latter axis by means of a mass of elastomeric material acting upon the trunnion at one end and at the other end reacting against a shoulder upon the chuck, socket or fronthead, the latching member having at least two faces oblique to one another and adapted alternatively to abut against the said abutment surface of the tool so as to retain the latching member engaged with or disengaged from the implement. The mass of elastomeric material may be in the form of an annulus embracing the chuck, socket or fronthead of the tool, and may then be disposed between and preferably bonded to rings slidable upon the chuck, socket or front head and bearing respectively on the trunnion and on the shoulder.

The latching member may be of generally stirrup or U-shape, having two limbs respectively pivoted upon coaxial trunnions that are movable parallel to the axis of the chuck, socket or front head at diametrically opposite sides thereof, in which case diametrically opposite abutment surfaces are preferably provided, and each limb of the latching member is provided with at least two oblique faces for cooperation with the two abutment surfaces.

In order that the resilient means utilized to bias the trunnion or trunnions may serve as a buffer to absorb the impact if, in the case of a percussive tool for example, the collar of the implement should be forcibly driven against the latching member, the mass of elastomeric material is preferably arranged so as to urge the trunnions away from the active end of the implement towards the rear of the tool so as to bring the oblique faces of the latching member into contact with abutment surfaces of the tool, which are then located on the tool behind the trunnions. Then, if the implement be driven forward, so that its collar impinges upon the latching member, the latter and the trunnion or trunnions are enabled to move forward towards the active end of the implement against the resilient bias, thus to absorb the impact.

For the better understanding of the invention one particular manner of applying it to a percussive rock drill will now be described by way of example only with reference to the accompanying drawing in which:

Fig. 1 is a part elevation and part section in a plane containing the axis of the front head of a typical rock drill;

Fig. 2 is a plan view of the front-head shown in Fig. 1;

Fig. 3 is a section on the line III—III of Fig. 1; and

Fig. 4 is an alternative section on the line III—III of Fig. 1.

In the particular constructions shown in the drawing diametrically opposite axially extending grooves 7 are provided in a cylindrical extension of the front-head 1 that houses the socket for receiving the drill rod 18. The grooves 7 may be rectangular as shown in Fig. 3 or of dove-tail shape as shown in Fig. 4. Trunnions 8 having rectangular bases 10 with splines 9 to fit the grooves 7 of either rectangular or dove-tail shape are slidable axially in the grooves 7. The ends of the two limbs 3 of a U-shaped or stirrup-like latching member or fork, having a yoke 16 adapted partially to embrace the shank of the drill rod 18 and to cooperate with a collar 22 thereon, are journalled on the two trunnions 8. The end of each limb 3 of the latching member is provided with three flat faces 4, 5 and 6 oblique to one another but all parallel with the axis of the trunnion. Faces 4 and 5 are disposed beyond pivot 8 to a greater degree than face 6. The front head of the tool is provided with flat radial abutment surfaces 2 against which the faces of the latching member may bear. A rigid ring 12, of steel for example, slidable axially on the cylindrical extension of the front head bears against the sides 11 of the bases 9 of the two trunnions and is resiliently urged axially towards the flat radial faces 2 of the front head by an axially resilient annulus 14, the opposite end of which abuts against a shoulder 19a provided by a rigid ring 19 secured to the front head extension by a resilient split ring 20 engaging and protruding beyond a circumferential groove 21 in the front head extension.

The resilient annulus 14 consists of elastomeric material, such as natural or synthetic rubber, preferably located between and bonded to two rigid metal rings 13 and 15.

The faces 4 and 5 of the limbs 3 of the latching member are so arranged that, when the pair 5 abuts against the abutment surfaces 2 of the front head, the yoke 16 of the latching member partially embraces the drill rod 18 and forms a stop co-acting with the collar 22 of the drill rod 18 to prevent withdrawal or ejection thereof; and that when the pair 4 abuts the abutments surfaces, the yoke of the latching member is clear of the shank of the drill rod 18, as shown in chain lines in Fig. 2, so that the latter may be withdrawn. The latching member is retained in either of these positions by abutment of its flat faces against the abutment surfaces 2 of the front head, and is permitted to be easily moved from one position to the other by axial sliding of the trunnions 8 against the resilient bias of the elastomeric annulus 14, thus permitting the corners between the flat faces 4 and 5 to pass over the abutment faces 2. If the collar 22 of the drill rod 18 should be impelled forcibly against the latching member, the latter with the trunnions 8 moves forwardly and the impact is absorbed by the annulus 14 of elastomeric material. When the latching member 16 is rotated so that faces 6 abut on surfaces 2 of the front head, the compression is removed from the elastomeric material of the resilient annulus 14 thereby facilitating the assembly or dis-assembly of the component parts of the retainer.

It will be appreciated that one particular manner of putting the invention into effect as applied to a percussive rock drill has been shown in and described in detail with reference to the accompanying drawing by way of example only, and that many modifications may be made without departing from the scope of the invention.

What is claimed is:

1. In a percussive tool including a cylindrical front head having an axial socket in its end in which a shank end of a drill rod is slidably received, a drill rod retainer comprising a latching member pivoted about an axis perpendicular to the longitudinal axis of the socket and the drill rod, a trunnion movable longitudinally on the front head and defining the pivot axis of the latching member, an abutment surface on the front head rearwardly of the trunnion and transversely to the longitudinal axis of the socket, a shoulder parallel to the abutment surface having a fixed position on the front head forwardly of the trunnion, an elastomeric member disposed between the trunnion and the shoulder acting upon the trunnion at one end and reacting against the shoulder at the other so as to bias the trunnion and the latching member toward the abutment surface, and the latching member having at least two faces oblique to one another and adapted alternatively to abut said abutment surface so as to retain the latching member in a first pivoted position of the latter engaged with the drill rod and in a second pivoted position thereof disengaged from the drill rod.

2. In a percussive tool according to claim 1, wherein the mass of elastomeric material is in the form of an annulus embracing the front head of the tool.

3. In a percussive tool according to claim 2, wherein the annular mass of elastomeric material is disposed between and preferably bonded to rings slidable upon the front head and bearing respectively on the trunnion and on the shoulder.

4. In a percussive tool according to claim 1, wherein the latching member is of generally stirrup shape having two limbs respectively pivoted upon coaxial trunnions that are movable parallel to the longitudinal axis of the front head at diametrically opposite sides thereof and which define the pivot axis of the latching member, and wherein diametrically opposite abutment surfaces are provided and each limb of the latching member is provided with at least two oblique faces for cooperation with the two abutment surfaces.

5. In a percussive tool according to claim 1, wherein the trunnion is slidably mounted in a groove extending axially of the front head.

6. In a percussive tool including a cylindrical front head having an axial socket in its end in which a shank end of a collared drill rod is slidably received, an elongated latching member of stirrup shape having a pair of limbs pivoted at one end about an axis perpendicular to the longitudinal axis of the socket and of the drill rod and having a connecting yoke at their opposite ends which in a first pivoted position of the latching member embraces the drill rod forwardly of the collar thereof and in a reversely pivoted position of the latching member is clear of the drill rod, a pair of diametrically opposed trunnions movable longitudinally of the cylinder head in grooves of the latter and defining the pivot axis of the limbs of the latching member, an abutment surface on the cylindrical head rearwardly of each trunnion and transversely to the longitudinal axis of the socket, shoulder means parallel to the abutment surfaces having a fixed position on the cylindrical head forwardly of the trunnions, an elastomeric member disposed between the trunnions and the shoulder means so as to bias the trunnions and as a consequence the latching member rearwardly toward the abutment surfaces, and each limb of the latching member having at its pivoted end two faces oblique to one another, one of which is adapted to abut the related abutment surface in the first pivoted position of the latching member so as to retain the latter in such position, and the other of which is adapted to abut the related abutment surface in the reversely pivoted position of the latching member so as to retain the latter in such position.

7. In a percussive tool, including a front head having an axial elongated socket in its front end in which slides an end portion of a drill rod having a stop collar between its ends, a forked latch the arms of which extend in part over opposite areas of the head and the bridge of which latch is disposed beyond the said front end and defines a bow adapted to closely embrace the drill rod beyond the stop collar; abutment means on the head spaced inwardly of the front end; shoulder means on the head at the front end; a pair of diametrically opposed pivots slidable longitudinally on the head between the abutment and shoulder means; resilient means between the pivots and the shoulder means having a fully expanded condition wherein the pivots are not pressured against the abutment means; the free ends of the said arms being pivotally mounted to the pivots and the latter defining an axis of rotation for the forked latch which is perpendicular to the longitudinal axis of the socket and the drill rod; each arm of the forked latch having a first, a second, and a third end face angularly disposed and contiguous to one another, of which the first and second faces extend beyond the outer dimension of the pivots to a greater degree than the third face; and the forked latch having three pivot positions, a first wherein the first face abuts the abutment means and the bow embraces the drill rod beyond the collar thereof; a second position wherein the second face abuts the abutment means and the bow is clear of the drill rod so as to permit axial withdrawal of the latter; and a third position wherein the third face opposes the abutment means, wherein the bow is clear of the drill rod in an opposite direction to that of the second position, and wherein the pivots are not pressured against the abutment means by the resilient means, the resilient means being partially expanded in the first and second positions of the forked latch and fully expanded in the third position of the latter.

References Cited in the file of this patent
UNITED STATES PATENTS

| | | |
|---|---|---|
| 1,680,644 | Shaff | Aug. 14, 1928 |
| 2,512,149 | Gartin | June 20, 1950 |
| 2,720,401 | Fuehrer | Oct. 11, 1955 |